United States Patent [19]

Butcher

[11] 4,289,117
[45] Sep. 15, 1981

[54] SOLAR PANEL UNIT AND SYSTEM FOR HEATING CIRCULATING AIR

[76] Inventor: Harry L. Butcher, 3081 E. 7110 South, Salt Lake City, Utah 84121

[21] Appl. No.: 8,438

[22] Filed: Feb. 1, 1979

[51] Int. Cl.³ .............................................. F24J 3/02
[52] U.S. Cl. .................................. 126/436; 126/435; 126/450; 126/449
[58] Field of Search ............... 126/417, 418, 428, 430, 126/436, 444, 445, 449, 450, 400; 165/81, 104 S

[56] References Cited

U.S. PATENT DOCUMENTS

| | | | |
|---|---|---|---|
| 4,067,314 | 1/1978 | Bollefer | 126/444 X |
| 4,098,262 | 7/1978 | Peters | 126/444 |
| 4,099,513 | 7/1978 | Skrivseth | 126/449 |
| 4,111,259 | 9/1978 | Lebduska | 126/428 X |
| 4,130,108 | 12/1978 | Patil | 126/449 X |
| 4,137,898 | 2/1979 | Koizumi et al. | 126/436 |
| 4,154,222 | 5/1979 | Yu | 126/450 |
| 4,170,223 | 10/1979 | Weidemann | 126/450 |

*Primary Examiner*—Samuel Scott
*Assistant Examiner*—Randall L. Green
*Attorney, Agent, or Firm*—Mallinckrodt & Mallinckrodt

[57] ABSTRACT

A solar panel unit for collecting solar heat and imparting it to circulating air has air flow directing means, desirably in the form of a perforated, corrugated baffle plate, sandwiched between a heat collector plate and a backing plate for passing air from one margin of the unit to an opposite margin thereof, with a peripheral wall enclosing the resulting heat collector chamber. Spaced from the collector plate, with a peripheral wall enclosing the resulting dead air space, is a transparent outer panel of glass or plastic for transmitting rays of the sun to the collector plate; and spaced from the backing plate, with peripheral and partition walls dividing the resulting space into air flow passages, is thermal insulation material. The collector plate is tightly secured against the baffle plate substantially at its midpoint and curves slightly therefrom toward its periphery, where it freely engages sealing pocket members that extend along lateral sides and ends of the unit, respectively, to form expansion slip joints peripherally of the unit and, together with special corner structure, to substantially isolate the insulating, dead air space from air flow. In the system, panel units are connected end-to-end so that the air flow passages thereof intercommunicate to provide ducts, and means are provided for introducing relatively cool air into one of the ducts and for removing heated air from another of the ducts. Each of the panel units has inlet ports along one margin thereof leading from the cool air duct into the heat collector chamber, and has outlet ports along an opposite margin thereof leading from the heat collector chamber into the warm air duct. The warm air is used to heat utility water and/or heat storage media before recycling as cool air.

13 Claims, 9 Drawing Figures

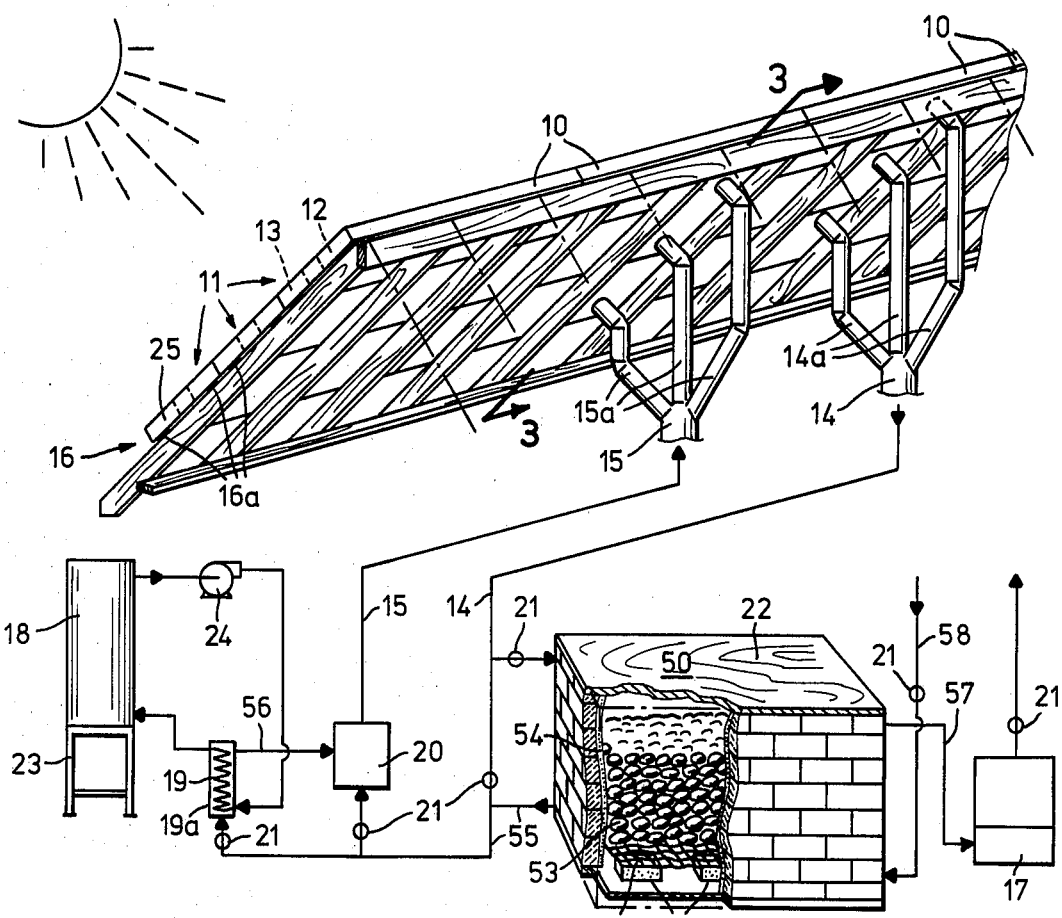
FIG. 1
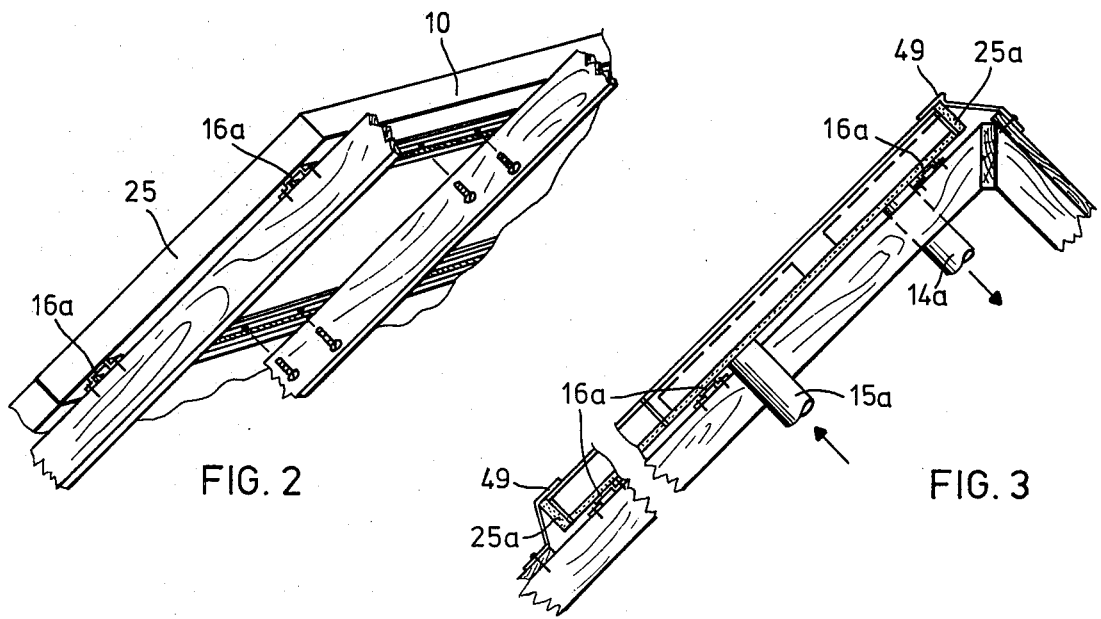
FIG. 2
FIG. 3

SOLAR PANEL UNIT AND SYSTEM FOR HEATING CIRCULATING AIR

BACKGROUND OF THE INVENTION

1. Field:

The invention is in the field of solar heating and circulation of air as a heat exchange medium.

2. State of the Art:

There has been considerable development of technology in the field of solar heating in recent years, much of this utilizing circulating air as a heat exchange medium. Corrugated baffle plates have been employed in various ways to delay passage of relatively cool air to be heated and to force it to closely traverse extended, heat-absorptive, transfer surfaces. Similarly, dead air space between a collector panel and on overlying transparent panel has been employed to prevent loss of collected heat. However, there have been continuing efforts to increase heating efficiency to enable widespread economic use of solar energy from a practical standpoint.

SUMMARY OF THE INVENTION

In accordance with the present invention, unique structural features of the solar panel unit maximize efficiency of the collection of solar heat and the transfer thereof to circulating air. Thus, the usual dead air space is maintained between a heat collector plate and on overlying, transparent, outer panel through which the sun's rays pass, but provision is made to accommodate expansion and contraction of the heat collector plate to maximize efficiency of heat transfer to air circulated below such heat collector plate.

Immediately underlying the heat collector plate is a heat collector chamber containing air flow directing means, advantageously in the form of a perforated baffle plate through and across which is passed air to be heated so the air will be repeatedly brought into contact with the underside of the heat collector plate.

Immediately underlying the heat collector chamber is a bottom-insulated chamber partitioned to provide air flow passages, one passage communicating with one side of the heat collector chamber along the length thereof and adapted to supply cool air and another passage communicating with the other side of the heat collector chamber along the length thereof and adapted to receive heated air from such chamber.

The solar panel units are adapted to be laid end-to-end, with ends of the respective cool air passages in registry to provide a cool air duct for the system and with ends of the respective heated air passages in registry to provide warm air duct for the system. Duct ends are capped.

There may be several side-by-side rows of the interconnected solar panel units in a system of such units, as is customary, the several units being placed on the roof or walls of a building, for example, to best capture rays of the sun. The warm air ducts of the rows are connected by suitable ductwork to input passages of heat storage or heat utilization equipment and the cool air ducts are similarly connected to exhaust passages thereof.

In accordance with one aspect of the invention, one or more hot water heater coils or the like are provided as a heat exchanger over which the heated air is blown, and one or more hot water storage tanks are provided at an elevated location to receive heated water from the coils. In accordance with another aspect of the invention, a special heat interchange box is provided so the system can be effectively tied in with a conventional hot air furnace for heating homes and small buildings.

THE DRAWINGS

A construction of solar panel unit and system presently contemplated as the best mode of carrying out the invention in actual practice is illustrated in the accompanying drawings, in which:

FIG. 1 is a fragmentary, schematic showing of the system, in which rows of end-to-end intercommunicating panel units are positioned on one slope of a sloping roof viewed from the ridge line, with the opposite roof slope removed;

FIG. 2 is an enlarged view of a lesser portion of the roof of FIG. 1 showing installation details;

Figure 4:
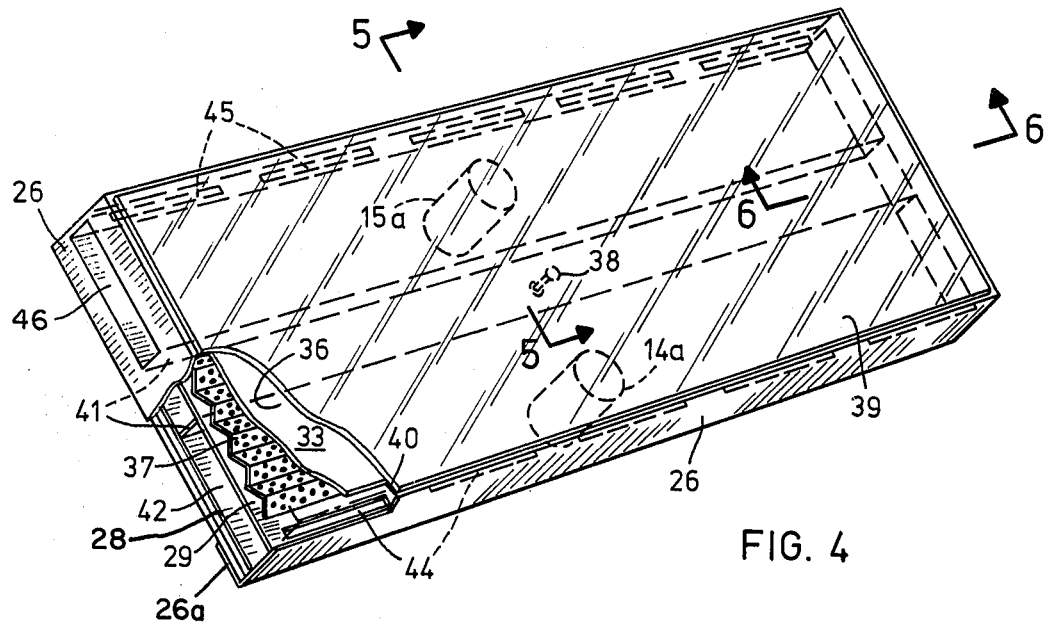
Figure 5:
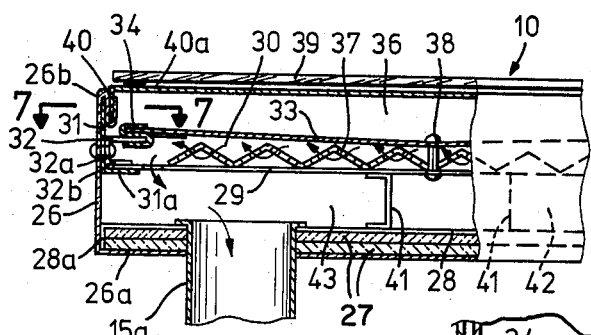
Figure 6:
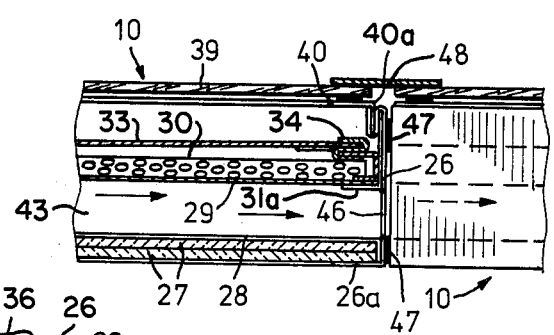
Figure 8:
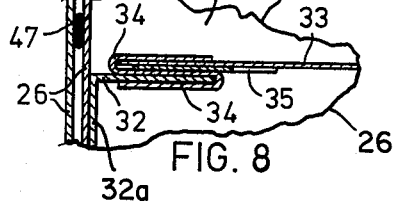
Figure 7:
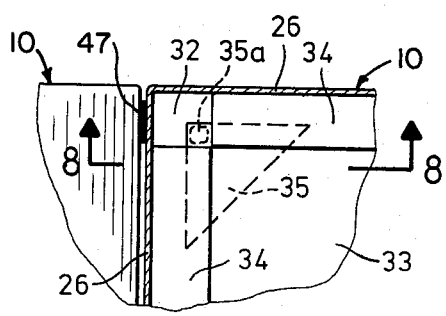

FIG. 3, a fragmentary vertical section taken on the line 3—3 of FIG. 1 and drawn to the larger scale of FIG. 2, an intermediate portion being broken out for convenience of illustration and the ridge and a portion of the opposite slope of the roof being shown;

FIG. 4, a perspective view of a single panel unit shown in the foregoing figures, looking from above and toward one end, the view being drawn to a scale somewhat larger than that of FIGS. 2 and 3, and respective corner portions of the outer transparent panel, the collector plate, and the peripheral enclosing wall being broken away to reveal the corrugated baffle plate;

FIG. 5, a fragmentary, transverse, vertical section taken on the line 5—5 of FIG. 4, a portion of the view being an end elevation of the panel unit;

FIG. 6, a fragmentary, longitudinal, vertical section taken on the line 6—6 of FIG. 4 and including a portion of an adjoining intercommunicating unit;

FIG. 7, a fragmentary horizontal section taken on the line 7—7 of FIG. 5, but at the corner in the background to show details of the mounting of the collector plate for expansion and contraction, an adjoining unit being included schematically to show the interconnection;

FIG. 8, a fragmentary vertical section taken on the line 8—8 of FIG. 7; and

Figure 9:
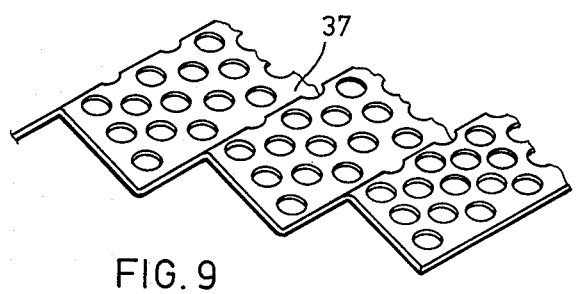

FIG. 9, a fragmentary perspective of the baffle plate showing how it is perforated for air flow transversely of the corrugations.

DETAILED DESCRIPTION OF THE ILLUSTRATED EMBODIMENT

The solar hot air system illustrated schematically in FIG. 1 comprises rectangular solar panel units 10 of the invention interconnected end-to-end in rows 11 to provide elongate warm air ducts or passage 12 and cool air ducts or passages 13. Connecting such ducts 12 and 13 with heat utilization and heat storage equipment is ductwork comprising a main warm air duct 14 having branches 14a connected with the warm air ducts 12, respectively, and a main cold air return duct 15 having branches 15a connected with the cool air ducts 13, respectively. As illustrated, the panel units 10 are installed on mounting channels 16a that extend along a portion of the sloping roof 16 of a building to be solar heated. A conventional hot air furnace 17 is normally used to distribute the heated air furnished by the panel units 10, thereby supplying supplemental heat as may be required, and a supply of hot water is furnished by a hot water tank 18 served by a heater coil 19 disposed in an air-circulation jacket 19a, which receives heated air from the panel units 10 as indicated. Air is circulated through the system by a blower 20, and flow to and from the panel units 10 is controlled by dampers 21 which are desirably thermostatically activated in well-known manner.

A heat storage box 22 of special construction is interposed in the ductwork between furnace 17 and the roof array of solar panels 10. Hot water tank 18 is elevated above jacketed water coil 19 by a stand 23, and water supplied from the usual source is circulated between heating coil and tank by means of a pump 24.

The solar panel units 10 are advantageously of identical formation so as to be capable of positioning at any location in the array, interconnection with the ductwork being made on the job by cutting through the bottom walls of the respective panels and using standard sheet metal techniques to provide substantially air-tight connections, see FIG. 5. Opposite ends of the units are either open initially by reason of fabrication in that manner or opened by cutting on the job, see the closed end in FIG. 5 which requires cutting. Open ends of terminal panel units are closed air-tight and insulated, as at 25, FIGS. 1 and 2, either by leaving appropriate end walls intact and applying insulation as at 25a, FIG. 3, or by the installation of respective caps and insulation.

In the form shown, each solar panel unit 10 is of rectangular formation and has upstanding peripheral walls 26 of sheet metal inturned at their bottoms, as at 26a, to provide support for panels 27 of thermal insulating material. For structural strength, it is desirable that such insulating panels be overlayed by a plate 28 of sheet metal secured in place by downturned lateral margins riveted to confronting walls 26.

Spaced upwardly from plate 28 a distance suitable to provide for air-flow passages therebetween is a plate 29 of sheet metal as a backing plate for a heat collecting chamber 30. As shown, such plate 29 rests freely on peripheral supporting flanges 31a that are inturned from sheet metal strips 31 riveted against the inside surfaces of respective walls 26. The same riveting secures downturned members 32a of sheet metal shelf members 32 to walls 26, inturned portions 32b of such shelf members 32 overlying the margins of backing plate 29 to hold such plate in place without interfering with expansion and contraction thereof under operating conditions.

Spaced above backing plate 29 and freely supported by shelf members 32 for expansion and contraction under operating conditions is a heat collector plate 33, heat collector chamber 30 being formed between backing plate 29 and heat collector plate 33 and its supporting shelves 32. Reverse pocketed, sealing strips 34, which may be satisfactorily fabricated from sheet metal strips bent to shape, provide effective interconnection between heat collector plate 33 and shelf members 32 intermediate the corners of the unit, the margins of plate 33 being engaged by one pocket of such sealing strips 34 and the shelf members 32 being engaged by the other pocket thereof.

At the corners of the unit, see FIGS. 7 and 8, effective sealing is achieved by underlaying heat collection plate 33 with corner pieces 35 and by undersealing the corner portions of such pieces 35 to the respective underlying shelf members 32 by the application of a suitable mastic 35a, preferably a silicone type such as RTV 118 high temperature silicone made by General Electric Company, it being understood that the corner pieces 35 are slipped freely into the same pockets of the sealing strips 34 that serve to receive plate 33. In this way, plate 33 is free to expand and contract substantially without leakage of air from heat collector chamber 30 into overlying dead air chamber 36 about to be described.

Heat collector plate 33 may be any of the various types commercially available for the purpose, usually a sheet of aluminum metal having a blackened upper surface which absorbs heat from the sun's rays striking the surface. A preferred type is disclosed in U.S. Pat. No. 3,857,766 and is obtainable from Permaloy Corporation, Ogden, Utah.

Within heat collector chamber 30 is positioned airflow directing means for insuring that air circulated through such chamber is brought into intimate contact with the underside of heat collector plate 33. Although such means may take various forms, it is preferred to employ a corrugated baffle plate 37 which is perforated throughout so air will flow transversely of the corrugations from one lateral side of the plate to the other.

Heat collector plate 33 is preferably attached to backing plate 29 at approximately the mid-point of such plate, as by means of a rivet 38, so as to bear down onto the corrugations of baffle plate 37 at and adjacent to such mid-point. As illustrated, see particularly FIG. 5, such collector plate 33 is slightly lower at its center so as to be somewhat bowed and free to expand and contract throughout.

Spaced upwardly from heat collector plate 33 is an outer, glazing panel 39 of glass or other transparent material, such as a transparent plastic, so as to provide insulating dead air chamber 36 through which the sun's rays are transmitted directly onto the blackened surface at heat collector panel 33. Glazing panel 39 is supported by flanges 40a of angle pieces 40 and extend inwardly from peripheral walls 26. As shown, angle pieces 40 are separate from walls 26 and are attached thereto by a double pocket formation 26b, FIG. 5, provided by reverse bending of the upper margins of upstanding peripheral walls 26. Glazing panel 39 is superimposed upon flanges 40 and sealingly secured thereto by a mastic adhesive, as shown in FIG. 5.

The space between plates 28 and 29 is partitioned to provide air-flow passages for carrying cool air and heated air, respectively. Such passages are of size determined by the requirements of the heating system served. As shown, two partitions 41 are employed to provide a cool air passage 42 and a heated-air passage 43, both extending longitudinally of the unit from end-to-end thereof. Ports 44 along one lateral side of plate 29 provide for inflow of cool air from passage 42 to heat collector chamber 30, and ports 45 along the other lateral side of plate 29 provide for outflow of heated air into passage 43 after the air has traversed the perforated corrugations of baffle plate 37.

The ends of passages 42 and 43 are open, as by means of openings 46, FIGS. 4 and 6, cut through normally closed end walls 26, except at the outer ends of the rows 11 of intercommunicating units, where they are left closed and insulated, as at 25, FIGS. 1 and 2, and 25a, FIG. 3. Adjoining units 10 are preferably sealingly joined by mastic adhesive 47, FIGS. 6 and 7. The joinders are desirably covered by sheet metal strips 48 as protection against the weather. Elongate strip flashings 49, FIG. 3, are advantageously provided to extend along and cover upper and lower margins and side walls of the panel unit array.

In the illustrated system, storage box 22 is constructed of bricks laid on a concrete slab, and with a plywood cover 50 sealed in place. Blocks 51 on the slab support heavy wire, chain link mesh 52, which, in turn, supports a filling of crushed rock 53 sized from ½" to ¾". The interior of the box is lined with insulation 54, e.g. 2" thick panels of a foamed plastic material. Main warm air duct 14, supplies heated air to the box near its top from where it passed through the bed of rocks 53 and by way of a duct 55 at the bottom of the box to jacket 19a and then to cool air return duct 15 by way of a duct 56 and blower 20. A duct 57 carries hot air to furnace 17 from near the top of box 22, and relatively cool air from the building is returned to the bottom of the box by way of a duct 58.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A substantially rectangular, solar panel unit for heating circulating air, comprising a heat collector plate freely mounted peripherally for expansion and contraction; a backing plate spaced below the collector plate to provide heat collector space; air-flow directing means sandwiched between the collector plate and the backing plate; a transparent outer panel spaced above the collector plate to provide dead air space for transmitting solar rays to the collector plate while inhibiting heat loss; peripheral walls enclosing the heat collector space and the dead air space to provide corresponding substantially closed chambers; thermal insulation material spaced and secured below the backing plate to provide space for air circulation; walls dividing the air circulation space into mutually parallel cool air and heated air passages, respectively, along mutually opposite sides of the unit; air flow ports leading into the heat collector chamber from the cool air passage along one side of said collector chamber; air flow ports leading from the heat collector chamber into the heated air passage along the other side of said collector chamber, the cool air and the heated air passages being adapted to be open at their ends, respectively, for air flow intercommunication with adjoining units in a solar heating system; and means mounting said heat collector plate for free expansion and contraction while substantially preventing flow of air into the dead air chamber.

2. A solar panel unit according to claim 1, wherein the means mounting the heat collector plate for free expansion and contraction comprises a peripheral shelf extending inwardly from the peripheral walls at approximately the level of the heat collector plate; reverse pocketed, sealing strips respectively engaging, with one pocket thereof, said peripheral shelf and engaging the heat collector plate with the other pocket thereof.

3. A solar panel unit according to claim 2, wherein the reverse pocketed sealing strips extend between, but short of, the corners of the unit; and wherein there are corner-formed insert pieces at the respective corners of the unit underlying the collector plate and overlying the peripheral shelf, and a mastic material sealing said insert pieces to the peripheral shelf.

4. A solar panel unit according to either claim 1 or 2, wherein the air-flow directing means is a corrugated baffle plate having its corrugations extending substantially in parallel with the air flow passages of the air circulation space of the unit.

5. A solar panel unit according to claim 1 or 2, wherein the means mounting the heat collector plate for free expansion and contraction further comprises means anchoring the heat collector plate to a stationary member of the unit substantially at the midpoint of said collector plate.

6. A solar panel unit according to claim 5, wherein the anchoring means is a rivet.

7. A solar panel unit for heating circulating air, comprising means defining a heat collector chamber having a heat collector plate forming the top of said chamber and being mounted for expansion and contraction; means defining a solar-ray-transmitting dead air chamber immediately above the heat collector plate; air-flow directing means within the heat collector chambers; means at and substantially limited to the center of said heat collector plate bowing it and anchoring it to a stationary member of the unit for free expansion and contraction; and means for substantially preventing flow of air peripherally of said heat collector plate into said dead air chamber while permitting free expansion and contraction of the heat collector plate, said panel unit being adapted for connection in an air circulation system.

8. A hot air, solar heating system, comprising a plurality of solar panel units, each unit comprising means defining a heat collector chamber having a heat collector plate forming the top of said chamber and being mounted for expansion and contraction, means defining a solar-ray-transmitting dead air chamber immediately above the heat collector plate, air-flow directing means within the heat collector chamber, means at and substantially limited to the center of said heat collector plate bowing it and anchoring it to a stationary member of the unit for free expansion and contraction, and means substantially preventing flow of air peripherally of said heat collector plate into said dead air chamber while permitting free expansion and contraction of the heat collector plate; means defining cool air flow passages and heated air flow passages immediately below and in communication with the heat collection chamber to provide for air circulation through the unit, said units being interconnected end-to-end in sealed air-flow relationship relative to one another so that the cool air passages of the respective units form an elongate cool air passage and the heated passages thereof form an elongate heated air passage; a hot air duct connecting said heated air passage with heat utilization or storage equipment; a cold air return duct connecting the heat utilization or storage equipment with said cool air passage; and blower means associated with either said hot air passage of said cold air passage for circulating the air through the system.

9. A system according to claim 8, wherein there are side-by-side rows of the plurality of solar panel units; the hot air duct includes branches connected with the respective heated air passage of said rows; and the air return duct includes branches connected with the respective cool air passage of said rows.

10. A system according to claim 8, wherein the hot air and return ducts connect with heat utilization equipment comprising hot water heat exchange means and a hot water storage tank, the latter being elevated in position above the former.

11. A system according to claim 8, wherein the hot air and return ducts connect with heat storage equipment comprising a heat-insulated box structure containing heat-absorptive storage material; and there is a hot air furnace connected to draw heat from said box structure.

12. A solar panel unit adapted for connection in an air circulating system for heating circulating air, comprising means defining a heat collector chamber having a heat collector plate forming the top of said chamber and being mounted for free expansion and contraction; wall means below said heat collector chamber defining respective passages for cool air and for heated air at and along respective opposite sides of said heat collector chamber; means at and substantially limited to the center of the heat collector plate bowing said plate and anchoring it to a stationary member of said unit for said free expansion and contraction; and means substantially preventing flow of air peripherally of the heat collector plate to substantially prevent leakage of air from said heat collector chamber while permitting free expansion and contraction of the heat collector plate.

13. A solar panel unit according to claim 12, wherein the wall passage means located below the heat collector chamber are for circulating air through the heat collector chamber; and wherein the heat collector chamber is in air flow communication with the cool air passage along one side of the unit and is in air flow communication with the warm air passage along an opposite side of the unit so cool air will flow from said cool air passage into the heat collector chamber and heated air will flow from the heat collector chamber into said heated air passage.

* * * * *